United States Patent
Yamazaki

(10) Patent No.: US 7,513,564 B2
(45) Date of Patent: Apr. 7, 2009

(54) SKELETON STRUCTURAL MEMBER FOR TRANSPORTATION EQUIPMENT

(75) Inventor: Shouzi Yamazaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 433 days.

(21) Appl. No.: 10/562,822

(22) PCT Filed: Jun. 23, 2004

(86) PCT No.: PCT/JP2004/009208

§ 371 (c)(1),
(2), (4) Date: Dec. 28, 2005

(87) PCT Pub. No.: WO2005/003588

PCT Pub. Date: Jan. 13, 2005

(65) Prior Publication Data

US 2006/0165969 A1    Jul. 27, 2006

(30) Foreign Application Priority Data

Jul. 1, 2003    (JP)    ............... 2003-189838

(51) Int. Cl.
*B60J 7/00*    (2006.01)
(52) U.S. Cl. ............................... 296/187.02
(58) Field of Classification Search ............. 296/187.02
See application file for complete search history.

(56) References Cited

U.S. PATENT DOCUMENTS

| | | | | | |
|---|---|---|---|---|---|
| 4,019,301 | A | * | 4/1977 | Fox | 52/721.4 |
| 4,428,906 | A | * | 1/1984 | Rozmus | 419/48 |
| 4,547,337 | A | * | 10/1985 | Rozmus | 419/49 |
| 4,598,106 | A | * | 7/1986 | Utsugi | 523/218 |
| 5,102,188 | A | * | 4/1992 | Yamane | 296/205 |
| 5,609,385 | A | * | 3/1997 | Daniel et al. | 296/187.05 |
| 5,720,510 | A | * | 2/1998 | Daniel et al. | 296/187.05 |
| 5,871,253 | A | * | 2/1999 | Erber | 296/146.6 |
| 5,888,600 | A | * | 3/1999 | Wycech | 428/35.9 |
| 5,904,024 | A | * | 5/1999 | Miwa | 52/732.1 |
| 6,030,701 | A | * | 2/2000 | Johnson et al. | 428/343 |
| 6,040,350 | A | * | 3/2000 | Fukui | 521/135 |
| 6,135,542 | A | * | 10/2000 | Emmelmann et al. | 296/205 |
| 6,152,260 | A | * | 11/2000 | Eipper et al. | 181/296 |
| 6,199,940 | B1 | * | 3/2001 | Hopton et al. | 296/187.02 |
| 6,247,287 | B1 | * | 6/2001 | Takabatake | 52/731.6 |
| 6,287,666 | B1 | * | 9/2001 | Wycech | 428/122 |
| 6,332,731 | B1 | * | 12/2001 | Wycech | 403/171 |

(Continued)

FOREIGN PATENT DOCUMENTS

JP    56-34188    8/1981

(Continued)

*Primary Examiner*—Kiran B. Patel
(74) *Attorney, Agent, or Firm*—Rankin, Hill & Clark LLP

(57) ABSTRACT

A skeleton structure member made up of a skeleton member (11) having a cross-sectionally closed space (16, 33, 43, 63, 73, 83, 93) and multiple granules (17) packed inside the skeleton member. A granule flow allowing part (14, 42, 61, 71, 81, 92) for allowing movement of the multiple granules is provided inside the skeleton member and suppresses excessive rising of internal pressure within the skeleton member. The granule flow allowing part is provided in the vicinity of the multiple granules.

7 Claims, 11 Drawing Sheets

U.S. PATENT DOCUMENTS

| | | | |
|---|---|---|---|
| 6,357,819 B1 * | 3/2002 | Yoshino | 296/187.02 |
| 6,378,933 B1 * | 4/2002 | Schoen et al. | 296/187.02 |
| 6,455,126 B1 * | 9/2002 | Wycech | 428/122 |
| 6,786,533 B2 * | 9/2004 | Bock et al. | 296/187.02 |
| 6,863,957 B2 * | 3/2005 | Wycech | 428/174 |
| 6,865,811 B2 * | 3/2005 | Wycech | 29/897.2 |
| 6,866,331 B2 * | 3/2005 | Kropfeld | 296/187.02 |
| 6,890,021 B2 * | 5/2005 | Bock et al. | 296/187.02 |
| 6,929,312 B2 * | 8/2005 | Rich et al. | 296/187.02 |
| 7,097,794 B2 * | 8/2006 | McLeod et al. | 264/46.5 |
| 7,140,668 B2 * | 11/2006 | Wesch et al. | 296/187.02 |
| 7,226,120 B2 * | 6/2007 | Yamazaki | 296/187.03 |
| 7,290,828 B2 * | 11/2007 | Kosal et al. | 296/187.02 |
| 7,390,555 B2 * | 6/2008 | Shane | 428/151 |
| 2002/0033618 A1 * | 3/2002 | Kwon | 296/203.03 |
| 2004/0124666 A1 * | 7/2004 | Stahl | 296/187.02 |
| 2005/0058787 A1 * | 3/2005 | Ishikawa et al. | 428/34.1 |
| 2005/0124730 A1 * | 6/2005 | Yamazaki | 523/218 |
| 2005/0279567 A1 * | 12/2005 | Ito | 181/207 |
| 2006/0152041 A1 * | 7/2006 | Igarashi et al. | 296/187.02 |
| 2006/0233978 A1 * | 10/2006 | Yamazaki | 428/34.1 |
| 2007/0092685 A1 * | 4/2007 | Yamazaki | 428/68 |

FOREIGN PATENT DOCUMENTS

| | | |
|---|---|---|
| JP | 61-149633 | 7/1986 |
| JP | 2000-274471 | 10/2000 |

* cited by examiner

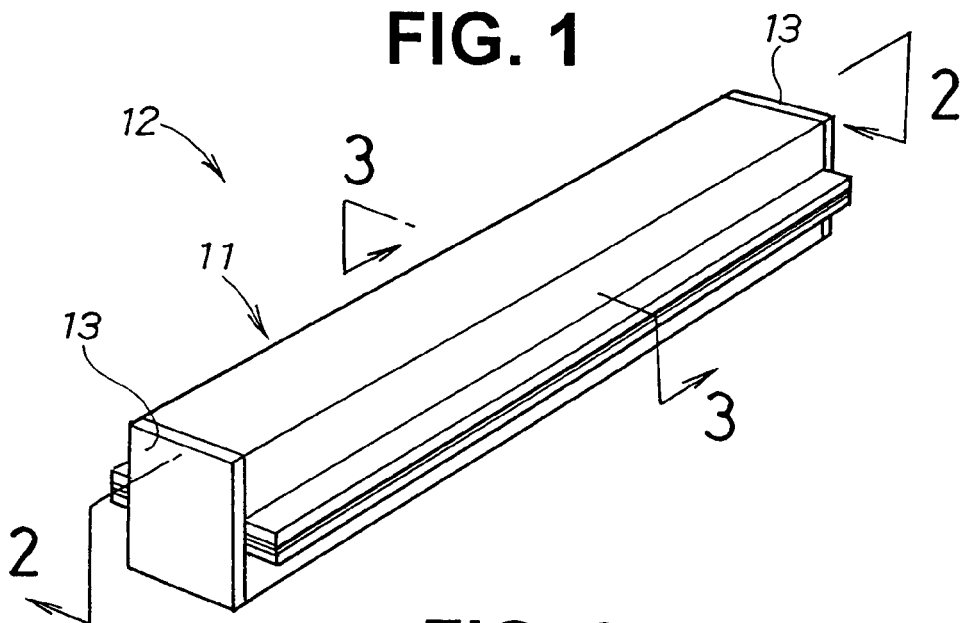
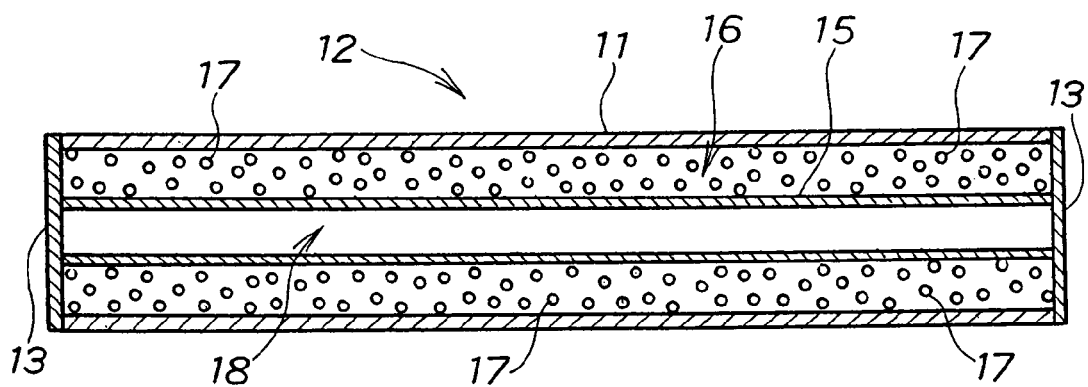
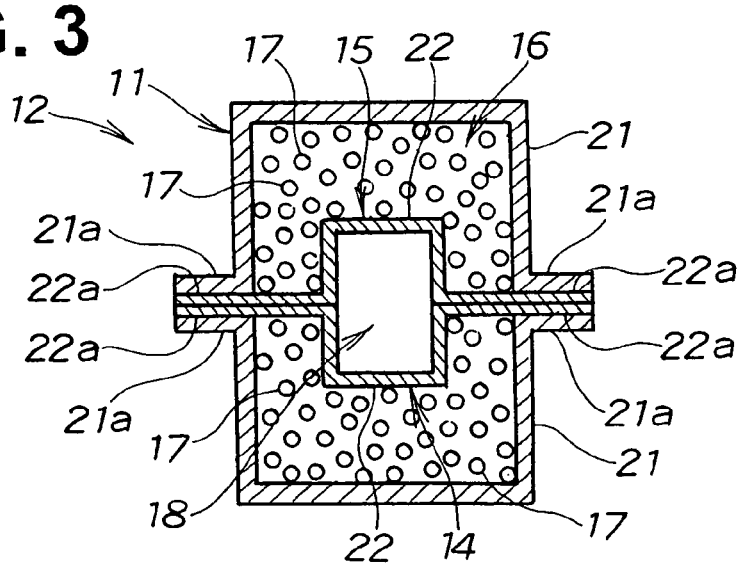

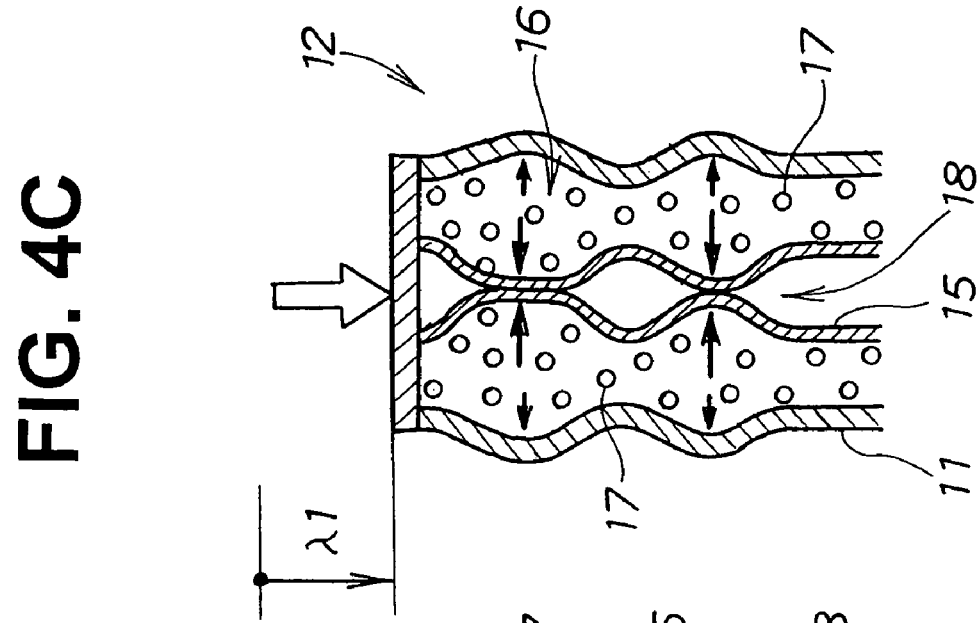
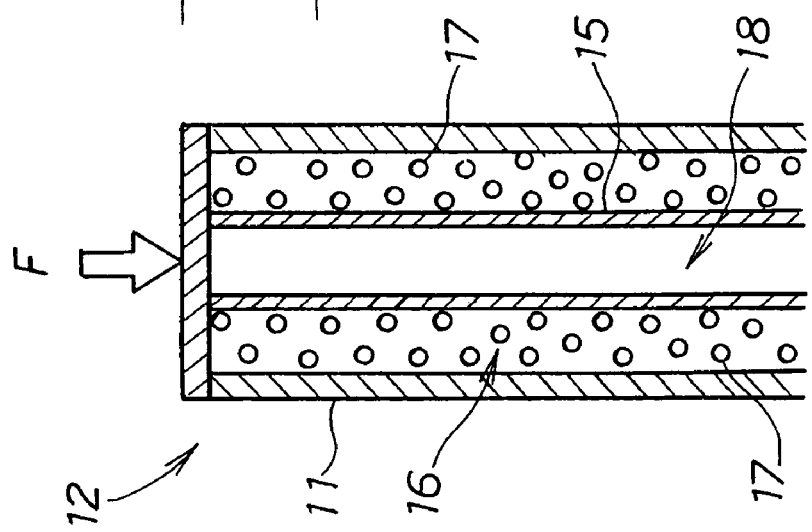
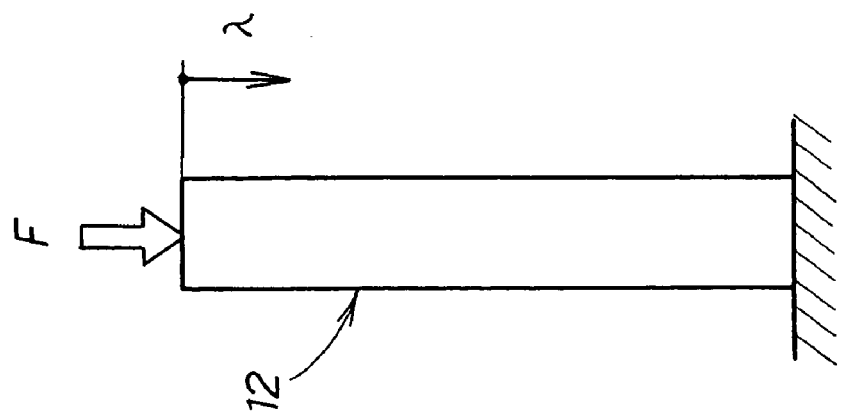

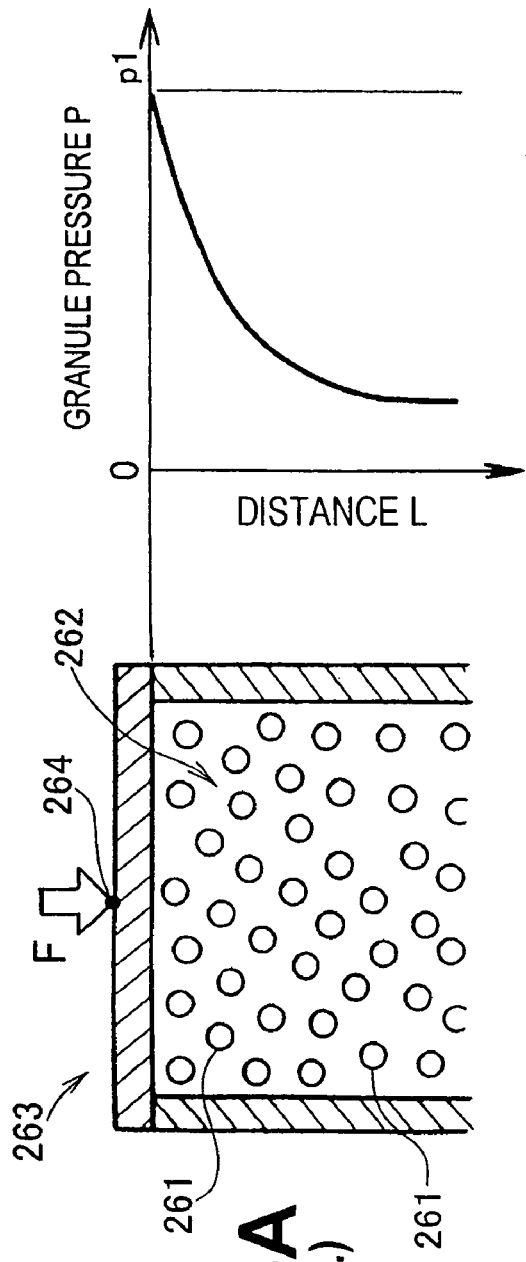
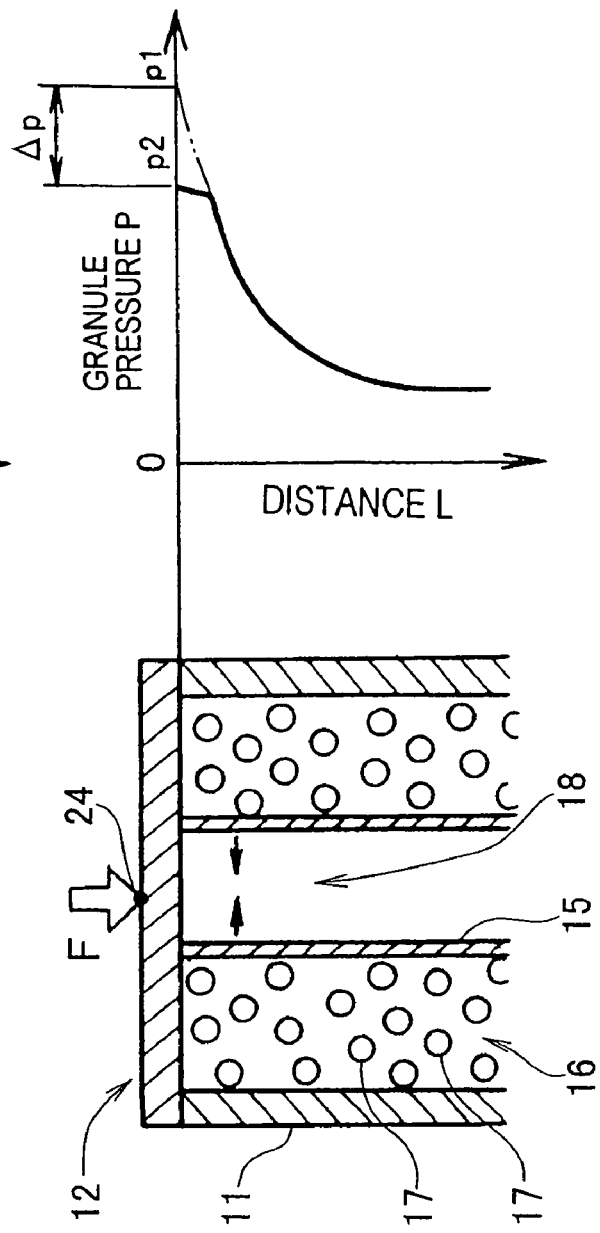
FIG. 5A (Comp. Ex.)
FIG. 5B (Embodiment)

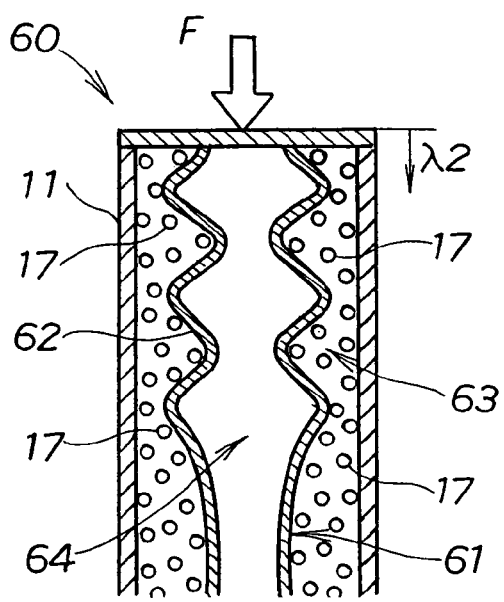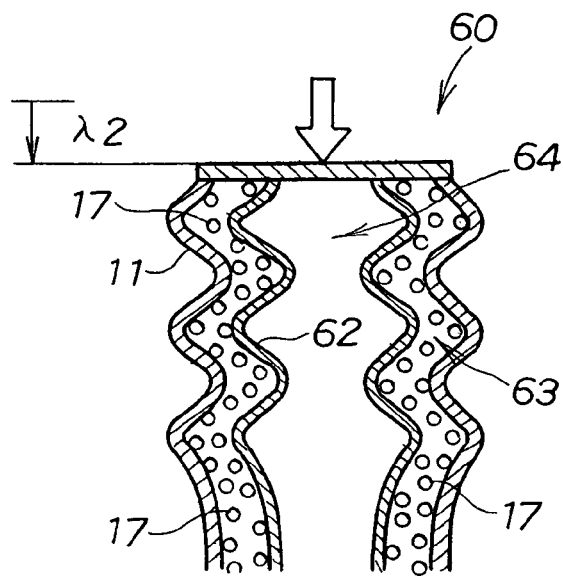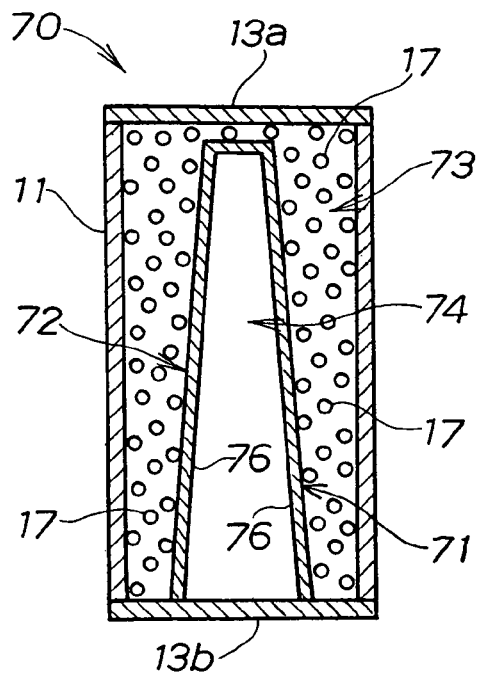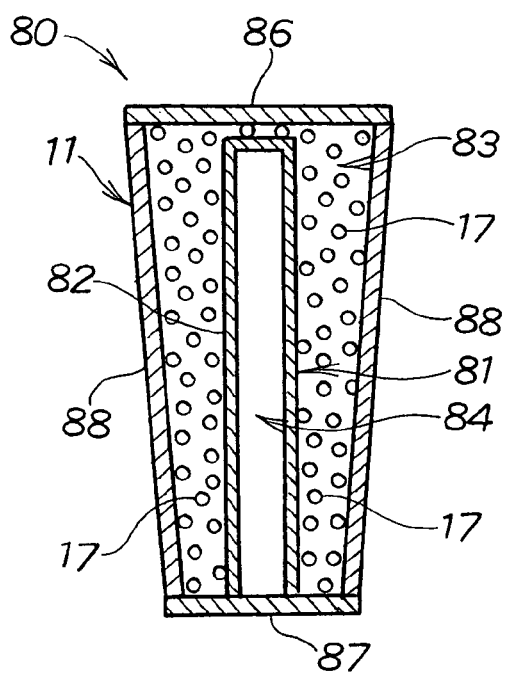

(a) (b)

SKELETON STRUCTURAL MEMBER FOR TRANSPORTATION EQUIPMENT

TECHNICAL FIELD

This invention relates to a skeleton structure member for use in a transport machine such as a railroad car, an industrial vehicle, a ship, an aircraft, an automobile or a motorcycle.

BACKGROUND ART

Skeleton structure members made by filling a skeleton member with a granular bulk material are known from for example JP-A-2002-193649, U.S. Pat. No. 4,610,836 and U.S. Pat. No. 4,695,343. Also, skeleton structure members made by filling a skeleton member with a gel are known from for example JP-A-9-136681.

FIG. 13 shows a solidified granular bulk material of a skeleton structure member disclosed in JP-A-2002-193649.

As shown in FIG. 13, the solidified granular bulk material 200 is made up of multiple granules 201 and a binder 202 consisting of a resin or an adhesive packed between the granules 201 to solidify the granules 201, whereby the granules 201 are bonded together into a solid. The granules 201 are packed into a mold in a dense state, and then the binder 202 is poured in to form the solidified granular bulk material 200. This solidified granular bulk material 200 is inserted into a skeleton member of a vehicle body or the like to make a skeleton structure member, and the strength and rigidity of the vehicle body is thereby raised.

FIG. 14 shows a solidified granular bulk material of a skeleton structure member set forth in U.S. Pat. No. 4,610,836 and U.S. Pat. No. 4,695,343.

This solidified granular bulk material 210 made by bonding together and thereby solidifying multiple granules for insertion into a skeleton member is made up of multiple small glass spheres 212 serving as granules coated with an adhesive 211. These glass spheres 212 are wrapped with a cloth made of glass fiber and packed into a skeleton member to make a skeleton structure member.

FIG. 15 shows a skeleton structure member disclosed in JP-A-9-136681. This skeleton structure member 220 has a gel 223 packed between two lower panels 221, 222. The reference number 224 denotes an orifice provided in the lower panel 222, and 225 a cap for plugging the orifice 224.

For example when in a vehicle collision or the like an excessive pressure arises in the gel 223, the cap 225 comes out under that pressure and allows the gel 223 to spurt out, whereby impact energy is absorbed.

A crush test method for applying a load to and forcibly breaking a skeleton structure member and results of crush tests carried out by this method on the skeleton structure members of related art shown in FIG. 13 to FIG. 15 are shown below.

FIG. 16 and FIG. 17 show details of the crush tests carried out on the skeleton structure members of related art, FIG. 16 illustrating the crushing and FIG. 17 being a graph showing the results of the crush tests.

In FIG. 16A, a skeleton structure member 232 made by filling a skeleton member 231 having a hollow square cross-section with granules is forcibly deformed by a compressive load F being applied to it in the length direction as shown with an arrow.

In FIG. 16B, when the deformation of the skeleton structure member 232, and specifically the displacement of the end of the skeleton structure member 232 under the load, is written $\lambda$, as the displacement $\lambda$ increases the skeleton structure member 232 either buckles into a bellows shape or bends into a Z shape like that shown in the figure or into a dog-leg shape.

FIG. 17 is a graph showing the relationship between the load F and the displacement $\lambda$ of the skeleton structure member when it is deformed as shown in FIG. 16B. The vertical axis shows the load F and the horizontal axis the displacement $\lambda$. Four test pieces were used: Comparison Example 1 (unfilled), which was a skeleton member only, not packed with any filler; Comparison Example 2 (granules bonded with binder), which was that shown in FIG. 13 made by bonding granules with a binder; Comparison Example 3 (small spheres bonded with adhesive), which was that shown in FIG. 14 made by bonding small spheres with an adhesive; and Comparison Example 4 (low-strength granules) filled with a granules of lower strength than Comparison Example 2 and Comparison Example 3.

In Comparison Example 1, the load F is small but the displacement $\lambda$ at which the skeleton member collapses into a bellows shape is large. The displacement d1 at this time is the displacement at which the skeleton member collapses completely, and is the effective stroke (that is, the displacement $\lambda$ from zero to d1) over which energy applied from outside can be absorbed effectively. After this effective stroke the load F increases sharply.

Comparison Example 2 to Comparison Example 4 are shown as far as their effective strokes.

The area in the effective stroke region sandwiched between the line of Comparison Example 1 and the horizontal axis shows the energy absorbed by the skeleton structure member of Comparison Example 1, and the value obtained by dividing this absorbed energy by the effective stroke is the load f1 in the figure. That is, this load f1 is the average load in of Example 1.

From this, to increase the energy absorbed by a skeleton structure member, a high average load and a long effective stroke are necessary.

In Comparison Example 2 (granules bonded with a binder, described with reference to FIG. 13), the average load is very large but the displacement $\lambda$ is not so large. This is because, since the bonding of the granules is extremely strong, in the initial stage of deformation the internal pressure of the skeleton member rises excessively and the member bends into a Z-shape or a dog-leg shape, and after that the load decreases sharply. Consequently, the absorbed energy is not that much greater than that of Comparison Example 1.

In Comparison Example 3 (small spheres bonded with adhesive, described with reference to FIG. 14), for the same reason as in Comparison Example 2, the average load is large but the displacement $\lambda$ is not that large, and the absorbed energy is not much greater than that of Comparison Example 1.

In Comparison Example 4 (low-strength granules), because the granules themselves break up easily and the rise in the internal pressure of the skeleton structure member is not that sharp and the member does not bend into a Z-shape or a dog-leg shape, although the displacement $\lambda$ is greater than in Comparison Example 2 and Comparison Example 3, because the granules remain inside the skeleton structure member, the displacement $\lambda$ is smaller than in Comparison Example 1. Also, the average load is small, and as a result the absorbed energy is small.

From the foregoing results, it can be seen that it is difficult to raise the average load of a skeleton structure member and simultaneously extend its effective stroke.

With the skeleton structure member 220 shown in FIG. 15, because it is filled with the gel 223, when a load acts on the skeleton structure member 220, the gel 223 flows smoothly and spurts out through the orifice, and consequently the internal pressure of the skeleton structure member 220 is kept roughly constant during the deformation. As a result, local deformation does not arise, and a relatively large load can be maintained up to a large displacement.

However, when the skeleton structure member is filled with granules, because due to frictional forces between the granules the fluid motion of the granules is not as smooth as the fluid motion of the gel 223, it is difficult to keep the internal pressure constant.

This will now be explained in detail with reference to FIG. 18 to FIG. 20.

FIG. 18 shows deformation of a skeleton structure member having one drain hole for granules to discharge through like the skeleton structure member 220 shown in FIG. 15.

As shown in FIG. 18A, this skeleton structure member 240 is made up of a skeleton member 241, multiple granules 242 packed inside this skeleton member 241, and a cap 244 plugging a drain hole 243 formed in the skeleton member 241 to allow the egress of these granules 242.

As shown in FIG. 18B, a compressive load F is applied to the skeleton structure member 240 in its length direction as shown with an arrow. As a result, the internal pressure of the skeleton member 241 increases sharply, and the granules 242 push out the cap 244 shown in FIG. 18A and spurt out to outside through the drain hole 243.

As illustrated in FIG. 18C, the internal pressure of the granules 242 in the vicinity where the granules 242 have spurted out falls, the strength of the part near the drain hole 243 of the skeleton structure member 240 decreases, and the whole member bends about this part. As a result, the load supported by the skeleton structure member 240 becomes very small. Consequently, the energy absorbed by the skeleton structure member 240 is small.

FIG. 19 shows deformation of a skeleton structure member having a plurality of drain holes like that shown in FIG. 18.

The skeleton structure member 250 shown in FIG. 19A is made up of a skeleton member 251, multiple granules 242 packed into this skeleton member 251, and caps 254, 256 plugging a plurality of drain holes 252, 253 formed in the skeleton member 251 to allow the granules 242 to flow out.

As shown in FIG. 19B, a compressive load F is applied to the skeleton structure member 250 in its length direction as shown with an arrow. As a result, the internal pressure of the top of the skeleton member 251 increases sharply and the granules 242 push out the upper cap 254 shown in FIG. 19A and spurt out to outside through the drain hole 252.

As shown in FIG. 19C, the internal pressure of the granules 242 in the vicinity where the granules 242 spurted out falls, the strength of the part of the skeleton structure member 250 near the drain hole 252 decreases, and the whole member bends about this part.

When the load F is increased further, the internal pressure of the bottom of the skeleton structure member 251 increases and the granules 242 push out the lower cap 256 shown in FIG. 19B and spurt out to outside through the drain hole 253, and consequently the skeleton structure member 250 bends about the part around the drain hole 253 as shown in FIG. 19D.

Because bending occurs at the part near the drain hole 253 and the whole member folds like this, the load fluctuates markedly and as a result the absorbed energy does not increase.

FIG. 20 is a graph showing crush test results of the skeleton structure members 240, 250 shown in FIG. 18 and FIG. 19.

In the case of Comparison Example 5 (the skeleton structure member 240), which has one drain hole, the load F is small and the maximum value of the displacement λ is also small, and consequently the absorbed energy is low.

In the case of Comparison Example 6 (the skeleton structure member 250), which has a drain hole in each of a plurality of locations, the member displaced to a relatively large displacement d2 with the load F fluctuating greatly.

The numeral f2 in the graph is the average load of Comparison Example 6, and because this is not that large, the absorbed energy is also not that great as a result.

Accordingly, technology for increasing the energy absorbed by a skeleton structure member for use in a transport machine has been awaited.

DISCLOSURE OF THE INVENTION

This invention provides a skeleton structure member for use in a transport machine made by filling a space inside a skeleton member of a transport machine and/or a space bounded by a skeleton member and a panel member peripheral to it with multiple granules, characterized in that to suppress excessive rising of the internal pressure of the space when that internal pressure increases, a granule flow allowing part into which the multiple granules can move is provided close to the granules.

Because a granule flow allowing part into which the granules can move when the internal pressure of the skeleton member increases is provided in the vicinity of the granules like this, even when a load acts on the skeleton structure member from outside and the internal pressure of the space filled with the granules increases, along with that increase in pressure the granules move into the granule flow allowing part. Consequently, the internal pressure of the space does not rise excessively, local deformation such as the skeleton structure member folding can be prevented from occurring, and it is possible to support a large load through a large displacement. As a result, the energy absorbed by a skeleton structure member according to the invention is greater.

The granule flow allowing part of the invention preferably is provided inside the skeleton member and is formed as a cavity forming member having a cavity. In one preferred embodiment, this cavity forming member has a cross-sectional closed space. The cavity forming member may be a member having a bellows shape. Also, the cavity forming member may be a member having a wall part that widens from an end at which a load acts on the skeleton structure member to another end.

Also, the granule flow allowing part of the invention may consist of a foam material provided inside the skeleton member or may consist of granules less strong than the multiple granules mentioned above.

Also, the granule flow allowing part may be made up of a plurality of allowing parts of different lengths provided inside the skeleton member.

BRIEF DESCRIPTION OF THE DRAWINGS

FIG. 1 is a perspective view of a skeleton structure member according to a first embodiment of the invention;

FIG. 2 is a sectional view on the line 2-2 in FIG. 1;

FIG. 3 is a sectional view on the line 3-3 in FIG. 1;

FIG. 4A, FIG. 4B and FIG. 4C are views showing deformation taking place during a crush test of a skeleton structure member according to the first embodiment;

FIG. 5A and FIG. 5B are views comparing a comparison example and a preferred embodiment to illustrate a principle of deformation of a skeleton structure member according to the first embodiment;

FIG. 9A and FIG. 9B are sectional views of a skeleton structure member according to a fourth embodiment of the invention;

FIG. 10A and FIG. 10B are sectional views showing a skeleton structure member according to a fifth embodiment of the invention and an example of deformation thereof;

BEST MODES FOR CARRYING OUT THE INVENTION

Figure 6:
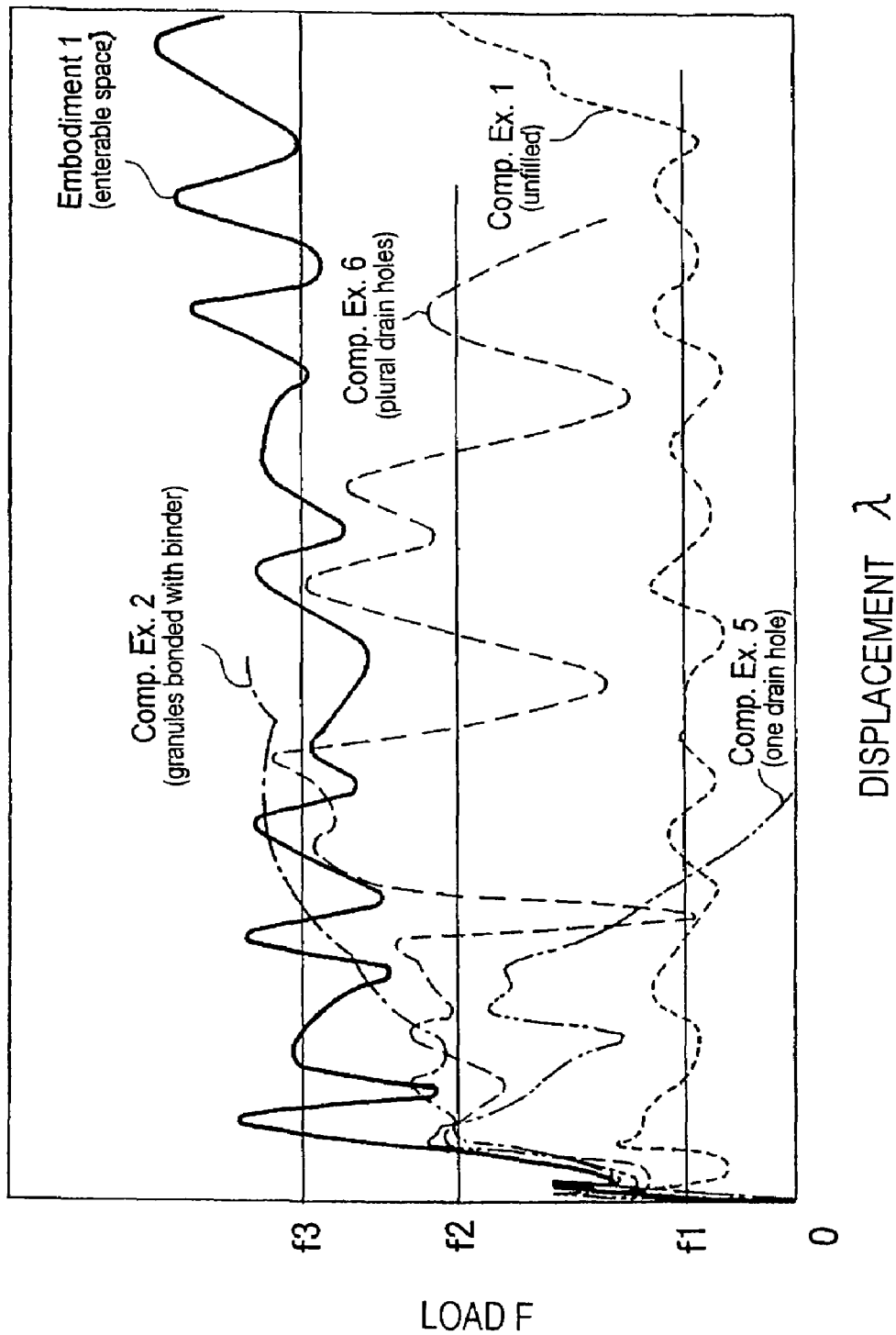
FIG. 6 is a graph showing a relationship between load and displacement in a crush test on a skeleton structure member according to the first embodiment.

FIG. 1, FIG. 2 and FIG. 3 show a skeleton structure member according to a first embodiment of the invention. As shown in FIG. 1, a skeleton structure member 12 for a transport machine according to a first embodiment (hereinafter written "skeleton structure member 12") has a structure wherein a hollow skeleton member 11 is filled with multiple granules. The reference numbers 13, 13 denote end closing members for closing the ends of the skeleton member 11.

As shown in FIG. 2, the skeleton structure member 12 is made up of the skeleton member 11 having a space 16 filled with multiple granules 17, and a granule flow allowing part 14 disposed inside the skeleton member 11.

This granule flow allowing part 14, in the first embodiment, consists of a cavity forming member 15. The cavity forming member 15 has a cavity 18.

As shown in FIG. 3, the skeleton member 11 is made up of two cross-sectionally U-shaped skeleton halves 21, 21 and flanges 21a, 21a formed integrally with the edges of the same. The two skeleton halves 21, 21 are brought face-to-face so as to form a cross-sectionally closed space and joined together with the cavity forming member 15 by the flanges 21a, 21a.

The cavity forming member 15 is made up of two cross-sectionally U-shaped forming member halves 22, 22 and flanges 22a, 22a formed integrally with the edges of the same. The two forming member halves 22, 22 are brought face-to-face so as to form a cross-sectionally closed space and joined to the flanges 21a, 21a of the skeleton halves 21, 21 by the flanges 22a, 22a.

The forming member halves 22 are members lower in strength than the skeleton halves 21, made easier to deform by for example being made smaller in plate thickness.

FIG. 4A to FIG. 4C show deformation of a skeleton structure member according to the first embodiment during a crush test.

As shown in FIG. 4A, a load F is applied as a compressive load to the skeleton structure member 12 in its axial length direction. The stroke of a pressing member (not shown) for applying the load at this time, that is, the downward displacement of the pressing member, will be written $\lambda$.

As shown in FIG. 4B, when the load F acts on the skeleton structure member 12, an internal pressure arises in the upper part of the space 16 of the skeleton structure member 12 filled with the granules 17. This is because the granules 17 are packed tightly in the space 16.

As shown in FIG. 4C, when the skeleton structure member 12 displaces by a displacement $\lambda$, the load in the direction perpendicular to the direction in which the load F is applied becomes large, and as shown with arrows the granules 17 push on the cavity forming member 15 and deform the upper part of the forming member 15 to the inside, i.e. to the cavity 18 side, and the granules 17 move toward the cavity 18 side. Although not as much as the cavity forming member 15, the skeleton member 11 also deforms, to the outside.

Consequently, because the internal pressure of the space 16 does not rise excessively and a predetermined internal pressure is approximately maintained, the cavity forming member 15 and the skeleton member 11 do not deform locally, and do not bend.

After that, the part where the internal pressure is high gradually moves down the skeleton structure member 12, and the skeleton member 11 and the cavity forming member 15 continue deforming as discussed above and absorbing energy.

If the load acting from outside is large and the internal pressure in the space 16 increases further, the cavity forming member 15 breaks, for example by cracks arising in the cavity forming member 15, and through these cracks the granules 17 flow into the cavity 18, preventing excessive rising of the internal pressure of the space 16.

FIG. 5A and FIG. 5B show the skeleton structure member of the first embodiment in contrast with a comparison example, to illustrate a principle of its deformation.

FIG. 5A is the comparison example, and shows a skeleton structure member 263 with a space 262 filled with granules 261 and a relationship between the granule pressure P (this is the pressure acting on the granules 261 in the direction perpendicular to the direction of the axial compressive load F when the axial compressive load F is applied to the skeleton structure member 263, and is the internal pressure of the space 262) and the distance L (the distance from the top end position of the space 262 to the bottom end position).

When the axial compressive load F is applied to the skeleton structure member 263 of the comparison example, the internal pressure of the space 262 increases. That is, if the point at which the load F is applied to the skeleton structure member 263 is called the load application point 264, the pressure P of the granules 261 near this load application point 264 is extremely large, and as the distance L increases the granule pressure P decreases. This is because unlike a gas or a liquid, in the granules 261, large frictional forces arise between adjacent granules 261 and between the granules 261 and the wall faces of the skeleton structure member 263, and the granule pressure P is not uniform inside the skeleton structure member 263 and falls rapidly with progress away from the load application point 264.

With respect to this, in this embodiment, as shown in FIG. 5B, when an axial compressive load F is applied to the skeleton structure member 12, because the cavity forming member 15 deforms to the cavity 18 side as shown with arrows, the granule pressure P does not rise excessively, and the maximum granule pressure p2 arising in the end of the space 16 near the load application point 24 is lower by Δp than the maximum granule pressure p1 of the comparison example. That is, although the granule pressure P decreases as the distance L increases, it tends more to be constant than in the comparison example.

By providing a low-rigidity part or a brittle part like the cavity forming member 15 and a cavity 18 for allowing deformation of the cavity forming part 15, that is, a cavity 18 into which the walls of the cavity forming member 15 and the granules 17 can move (a cavity 18 into which the granules 17 flow when the cavity forming member 15 has broken) in the forming member 15 in the skeleton structure member 12 like this, it is possible to prevent excessive pressure rise inside the space 16 when the granule pressure P tends to rise.

FIG. 6 is a graph showing the relationship between the load F and the displacement λ of when a crush test on the skeleton structure member of the first embodiment was carried out.

In the first embodiment, wherein a cavity (enterable space) into which granules can move is provided, if the average load is written f3, this average load f3 is greater than the average load f2 of Comparison Example 6 (with drain holes in a plurality of locations), and furthermore because the maximum displacement λ of the first embodiment is large, i.e. the effective stroke is large, compared to the comparison examples the absorbed energy can be made larger.

In this embodiment, as shown in FIG. 3, a square member forming a cross-sectionally closed space by two cross-sectionally U-shaped halves being brought together was shown as the skeleton member 11; however, the invention is not limited to this, and for example a closed space may be formed with a skeleton member having a cross-sectionally U-shaped open part and a panel member around the skeleton member, closing off the open part. That is, in this invention, multiple granules are packed into a space inside a skeleton member and/or a space bounded by a skeleton member and a panel member peripheral to it.

As explained with reference to FIG. 5A and FIG. 5B, the invention is a skeleton structure member 12 wherein a space inside a skeleton member 11 of a transport machine and/or a space bounded by a skeleton member 11 and a panel member peripheral to it is filled with multiple granules 17, and has the characteristic feature that excessive rising of the internal pressure of the space 16 is suppressed by a granule flow allowing part 14 into which the granules 17 can flow when the internal pressure of the space 16 has increased being provided near the granules 17 in the space 16.

As a result of a cavity 18 into which the granules 17 can move when the internal pressure of the space 16 has increased being provided in the vicinity of the space 16, for example when an axial compressive load acts on the skeleton structure member 12 from outside, even if the internal pressure of the space 16 filled with granules 17 increases, because along with that increase in pressure the granules 17 flow to the cavity 18 side, the internal pressure of the space 16 does not rise excessively, local deformation such as the skeleton structure member 12 folding can be prevented, a large load can be supported through a large displacement, and compared to related art it is possible to increase the amount of energy absorbed by the skeleton structure member 12.

Therefore, it is possible to absorb for example the impact energy of a vehicle collision with the skeleton structure member 12 effectively.

FIG. 7A to FIG. 7D show a skeleton structure member according to a second embodiment of the invention, and a crush test.

Figure 7A:
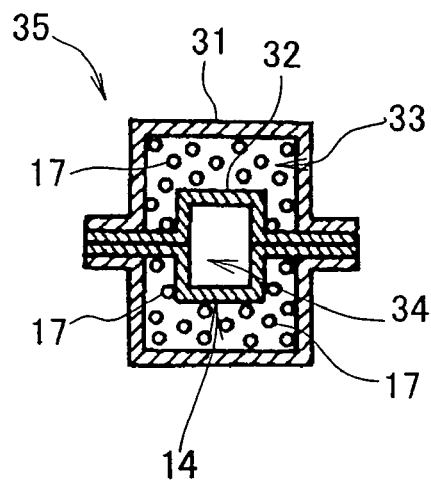
FIG. 7A is a view showing the construction of a skeleton structure member according to a second embodiment of the invention.

FIG. 7A shows a skeleton structure member 35 wherein a cavity forming member 32, which is a granule flow allowing part 14, is fitted inside a skeleton member 31, multiple granules 17 are packed in a space 33 between the skeleton member 31 and the cavity forming member 32, and a cavity 34 is provided in the cavity forming member 32.

Figures 7B, 7C:
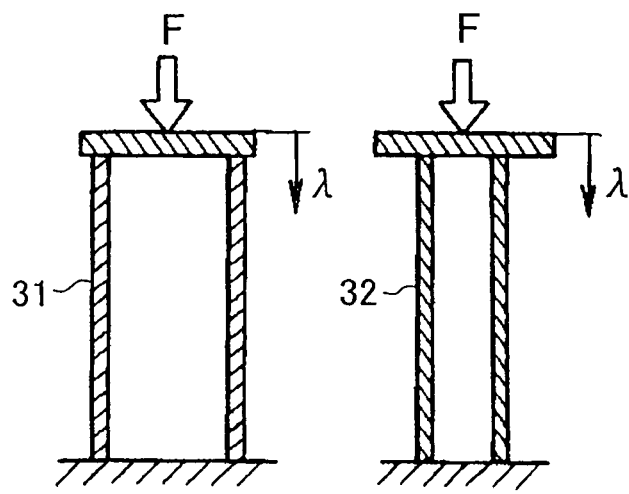
FIG. 7B and FIG. 7C are views illustrating crush tests.

In FIG. 7B, an axial compressive load F is applied to the skeleton member 31 on its own and the skeleton member 31 is thereby forcibly deformed. λ is the displacement.

In FIG. 7C, an axial compressive load F is applied to the cavity forming member 32 on its own and the cavity forming member 32 is thereby forcibly deformed.

Figure 7D:
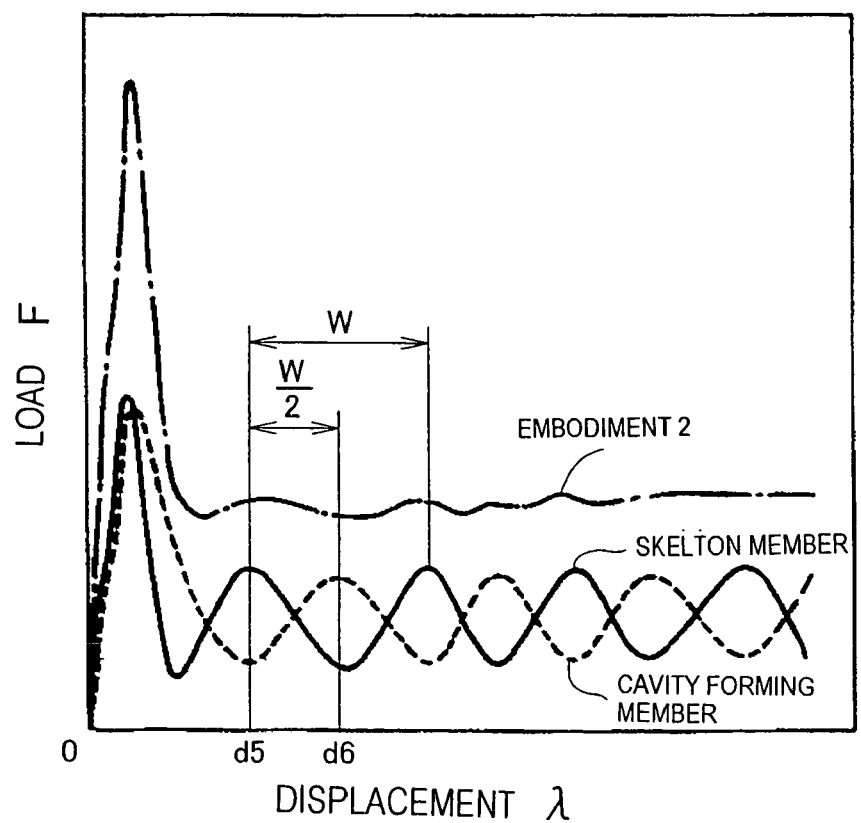
FIG. 7D is a graph showing a relationship between load and displacement during deformation.

FIG. 7D is a graph showing the relationships between the loads F and the displacements λ in the deformations of FIG. 7B and FIG. 7C.

The solid line in the graph is the result for the skeleton member and the dashed line is that for the cavity forming member. For example when the displacement λ at which the second peak (maximum value) of the load F on the skeleton member arises is written d5 and the wavelength of the skeleton member load is written W, if setting is carried out so as to stagger the phases so that the displacement λ at which the second peak (maximum value) of the load F on the cavity forming member lies at the displacement d6, W/2 larger than the displacement d5 of the skeleton member, then when the load on the skeleton member and the load on the cavity forming member are applied, the relationship between the load F and the displacement λ shown with the broken line is obtained. That is, this line is the characteristic of the skeleton structure member 35 of the second embodiment as shown FIG. 7A, and the load fluctuation is small.

As means for providing this phase difference, there are (1) the method of making the cross-sectional dimensions of the cavity forming member ½ of those of the skeleton member, (2) the method of providing beads (layers of weld metal) or notches (V-shaped cuts) in the cavity forming member, and (3) the method of assembling the skeleton member and the cavity forming member with their respective leading ends (the ends on which the load acts) staggered.

Figure 8A:
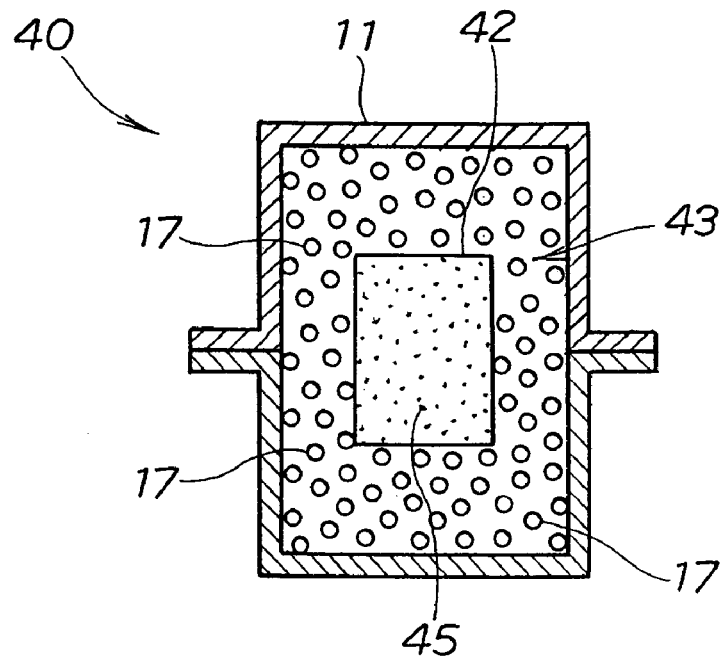
FIG. 8A and FIG. 8B are sectional views showing a skeleton structure member according to a third embodiment of the invention and an example of deformation thereof.
Figure 8B:
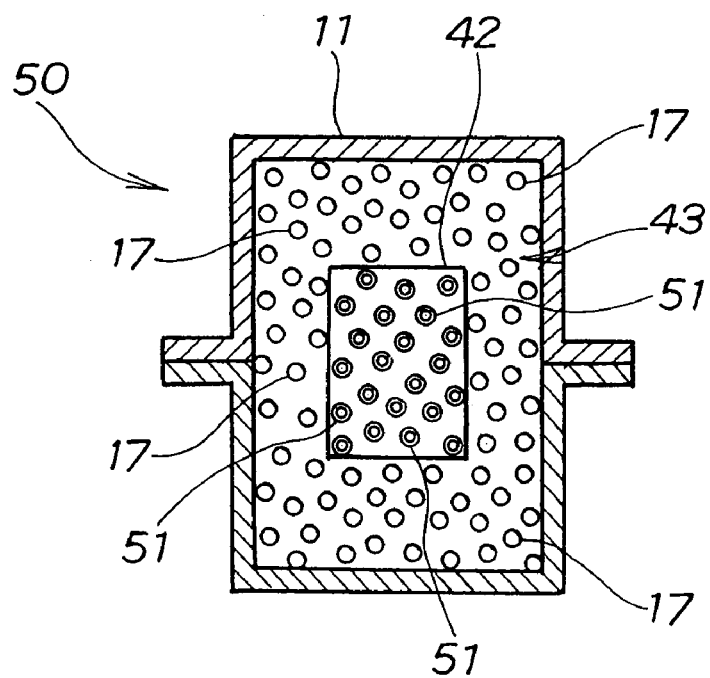

FIG. 8A and FIG. 8B show a skeleton structure member according to a third embodiment.

The skeleton structure member 40 of the third embodiment shown in FIG. 8A is made up of a skeleton member 11 and a granule flow allowing part 42 provided inside this skeleton member 11. Multiple granules 17 are packed in a space 43 between the skeleton member 11 and the granule flow allowing part 42, that is, the space 43 of the skeleton member 11. The granule flow allowing part 42 consists of a foam member 45.

The foam member 45 is made of polyurethane or foamed aluminum or the like. The foam member 45 is received in a for example filmlike receiving member.

When an axial compressive force is applied to the skeleton structure member 40, the internal pressure of the space 43 increases and the granules 17 push on the side walls of the foam member 45, and against the reaction force of the foam member 45 cause the wall faces of the foam member 45 to deform inwardly. As a result, the internal pressure of the space 43 remains substantially constant.

If the axial compressive load acting on the skeleton structure member 40 at this time increases, the internal pressure of the space 43 increases further, cracks arise in the wall faces of the foam member 45, granules 17 flow into the foam member 45 through the cracks, and excessive pressure rise inside the space 43 is prevented.

The skeleton structure member 50 shown in FIG. 8B is a variation on the skeleton structure member 40 shown in FIG. 8A, and is made up of a skeleton member 11 and a granule flow allowing part 42 provided inside this skeleton member 11. Granules 17 are packed between the skeleton member 11 and the granule flow allowing part 42. The granule flow allowing part 42 is made of hollow granules 51.

The hollow granules 51 are for example made by heating so-called microcapsules, made by atomizing a core substance consisting of a low-melting-point hydrocarbon (liquid or solid) and covering this core substance with a thermoplastic resin film (that is, wrapping it with a shell), to gasify the core substance and soften and inflate the film (the shell). The hollow granules 51 are packed in a for example filmlike receiving member.

When an axial compressive load is applied to the skeleton structure member 50, the internal pressure of the space 43 increases and the granules 17 push on the wall faces of the granule flow allowing part 42 and against the resistance of the hollow granules 51 deform the wall faces of the granule flow allowing part 42 inwardly.

At this time, by adjusting the amount of uninflated microcapsules first packed into the granule flow allowing part 42, it is possible to adjust the internal pressure of the granule flow allowing part 42 after the microcapsules are heated and inflate. Accordingly, the reaction force of the hollow granules 51 against the pushing force of the granules 17 is changeable, and it is possible to adjust the internal pressure of the space 43.

If the granule flow allowing part 42 is filled with granules that are more easily compressed than the granules 17 like this, when the internal pressure of the space 43 rises, the wall faces of the granule flow allowing part 42 are deformed to the side of the easily compressed granules.

FIG. 9A and FIG. 9B show a skeleton structure member according to a fourth embodiment of the invention.

In FIG. 9A, the skeleton structure member 60 of this fourth embodiment is made up of a skeleton member 11 having multiple granules 17 packed in a space 63, and a granule flow allowing part 61 provided inside this skeleton member 11. The granule flow allowing part 61 of this embodiment consists of a cavity forming member 62 that is bellows-shaped in vertical cross-section. This cavity forming member 62 has a cavity 64.

The cavity forming member 62 is a member that is preformed into the shape of a periodic wave (that is, the same waveform repeated cyclically) like the deformation that occurs when an axial compressive load is applied.

When an axial compressive load F is applied to the skeleton structure member 60, the internal pressure of the space 63 increases, and as shown in FIG. 9B, when the displacement reaches λ2, the granules 17 push on the wall faces of the cavity forming member 62. Because the bellows-shaped cavity forming member 62 has been formed in a periodic wave of deformation, the wall faces of the cavity forming member 62 smoothly deform into the cavity 64 so as to increase the amplitude of the periodic wave.

Along with this, the skeleton member 11 also deforms to substantially the same shape as the bellows-shaped cavity forming member 62. As a result, during the deformation of the skeleton structure member 60 the pressure of the granules 17 is kept approximately constant, fluctuation of the load is also small, a large load is maintained through a large displacement, and the energy absorbed by the skeleton structure member 60 increases.

FIG. 10A and FIG. 10B show a skeleton structure member according to a fifth embodiment of the invention.

The skeleton structure member 70 of the fifth embodiment shown in FIG. 10A is made up of a skeleton member 11 having multiple granules 17 packed in a space 73, and a granule flow allowing part 71 provided inside this skeleton member 11. The granule flow allowing part 71 consists of a cavity forming member 72 having a cavity 74. The cavity forming member 72 is tapered in vertical cross-section.

Here, if the end closing members 13, 13 of the skeleton member 11 shown in FIG. 2 are called the end closing member 13a on which the load is made to act and the other end closing member 13b, then the tapered cavity forming member 72 has tapering walls 76, 76 that widen from the end closing member 13a toward the end closing member 13b.

Because as explained with reference to FIG. 5B the granule pressure P falls with progress away from the load application point 24, in FIG. 10A, for example when an axial compressive load is applied to the end closing member 13a, the internal pressure of the space 73 gradually becomes smaller with progress from the end closing member 13a end toward the end closing member 13b end. Accordingly, if the horizontal cross-sectional area of the space 73 packed with the granules 17 is made to gradually decrease from the end closing member 13a toward the end closing member 13b, the internal pressure of the space 73, that is, the pressure among the granules 17 (i.e. the granule pressure) can be kept constant.

The skeleton structure member 80 shown in FIG. 10B is a variation of the skeleton structure member 70 of the fifth embodiment shown in FIG. 10A. This skeleton structure member 80 is made up of a skeleton member 11 with a tapering vertical cross-section, and a granule flow allowing part 81 provided inside this skeleton member 11. Multiple granules 17 are packed in a space 83 in the skeleton structure member 80. The granule flow allowing part 81 consists of a cavity forming member 82 having inside it a cavity 84.

The skeleton member 11 has end closing members 86, 87 at its ends, and has tapering walls 88, 88 formed so as to narrow with progress from the end closing member 86, at the end to which the load is applied, toward the other end closing member 87. The pressure acting inside this skeleton structure member 80 is the same as in the skeleton structure member 70 shown in FIG. 10A.

Figure 11:
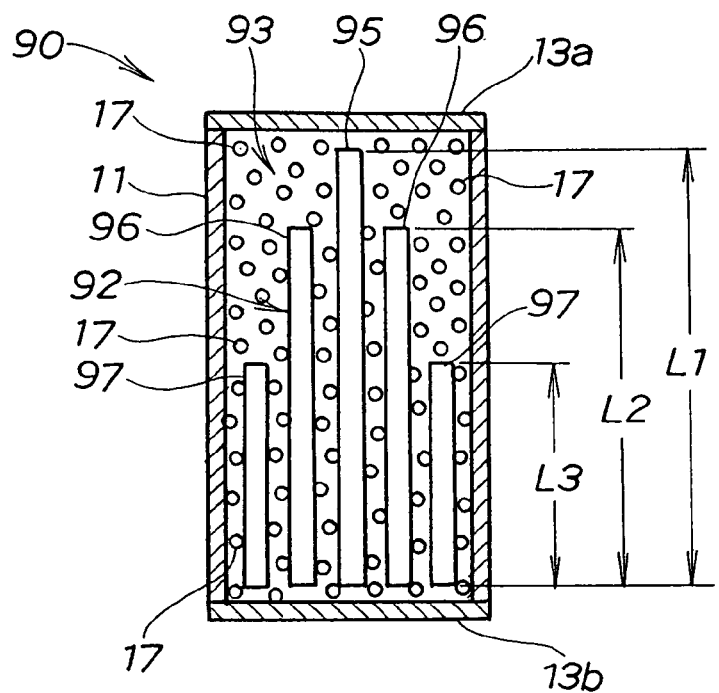
FIG. 11 is a sectional view showing a skeleton structure member according to a sixth embodiment of the invention.

FIG. 11 shows a skeleton structure member according to a sixth embodiment of the invention.

This skeleton structure member 90 is made up of an skeleton member 11 having a space 93 packed with multiple granules 17, and a granule flow allowing part 92 provided inside this skeleton member 11.

The granule flow allowing part 92 is made up of a central first allowing part 95, second allowing parts 96, 96 disposed on either side of the first allowing part 95, and third allowing parts 97, 97 disposed on the outer sides of the second allowing parts 96, 96, of different lengths and disposed in the length direction of the skeleton member 11.

The first allowing part 95, the second allowing parts 96, 96 and the third allowing parts 97, 97 are spaces formed example with membrane members or films.

When the end closing members 13, 13 of the skeleton member 11 are called the end closing member 13a on which the load is made to act and the other end closing member 13b, then the positions of the ends of the first allowing part 95, the second allowing parts 96, 96 and the third allowing parts 97, 97 are aligned at the end closing member 13b end.

If the respective lengths of the first allowing part 95, the second allowing parts 96, 96 and the third allowing parts 97, 97 are written L1, L2 and L3, then L1>L2>L3, and their horizontal cross-sectional areas are the same.

For example when an axial compressive load is applied to the end closing member 13a, because the internal pressure of the space 93 gradually decreases from the end closing member 13a toward the end closing member 13b, as a result of the horizontal cross-sectional area of the space 93 filled with the granules 17 being made to decrease in steps from the end closing member 13a end toward the end closing member 13b end by the multiple allowing parts 95, 96, 96, 97, 97 being provided, the internal pressure of the space 93, i.e. the pressure acting among the granules 17, becomes approximately constant.

Figure 12A:
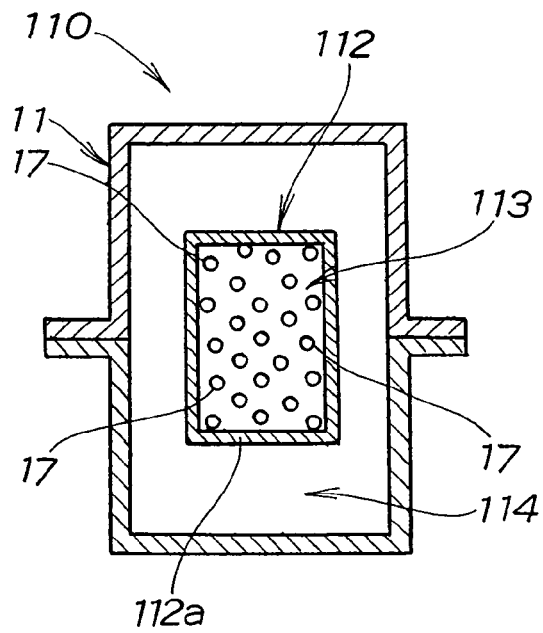
FIG. 12A and FIG. 12B are sectional views showing a skeleton structure member according to a seventh embodiment of the invention and an example of deformation thereof.
Figure 12B:
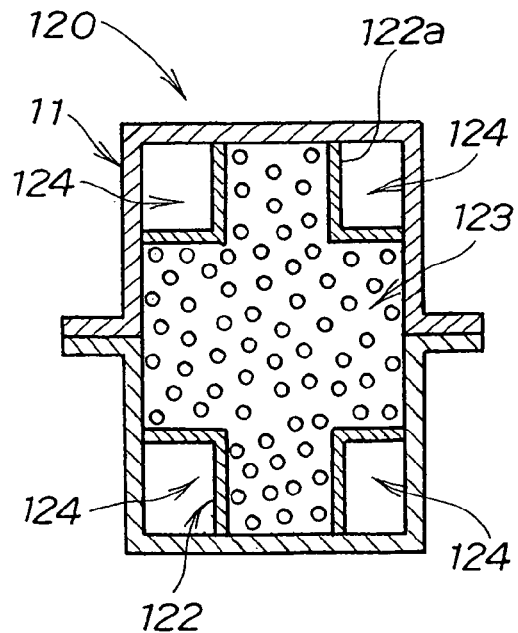
Figure 13:
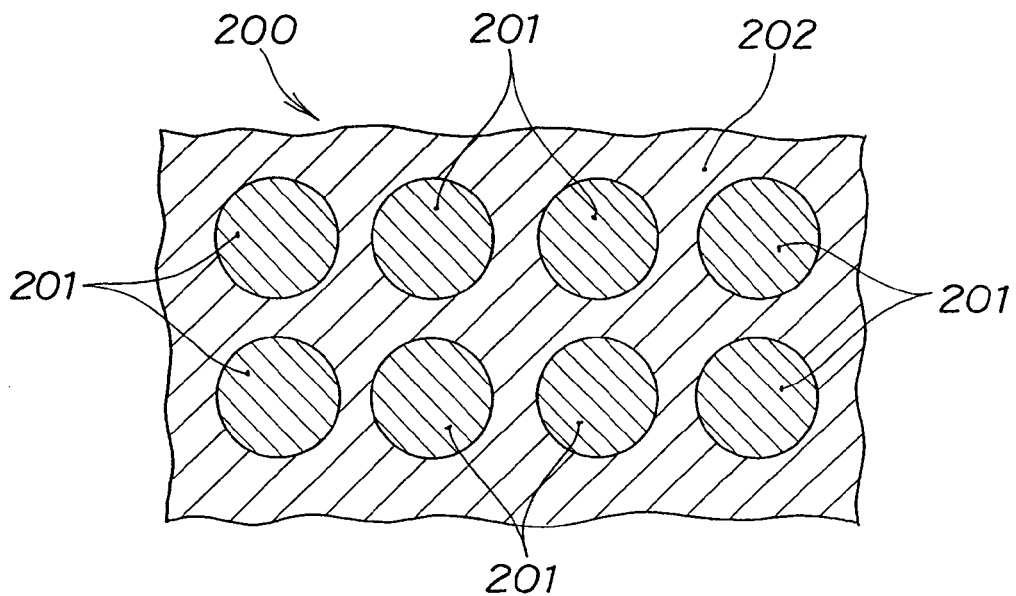
FIG. 13 is a sectional view showing a first skeleton structure member of related art.
Figure 14:
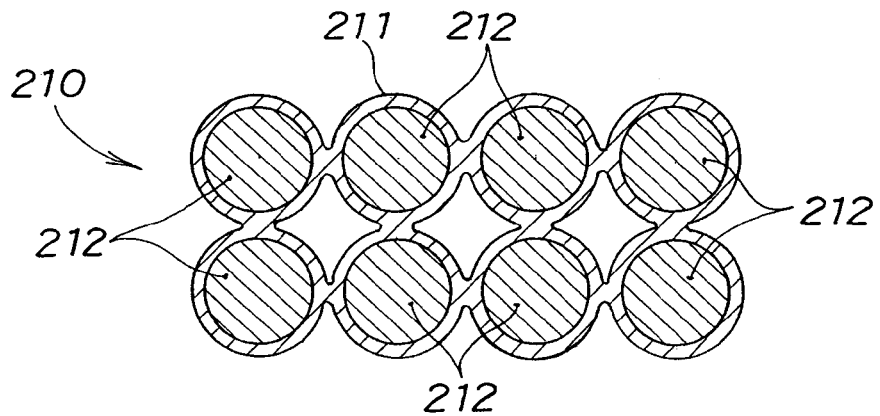
FIG. 14 is a sectional view showing a second skeleton structure member of related art.
Figure 15:
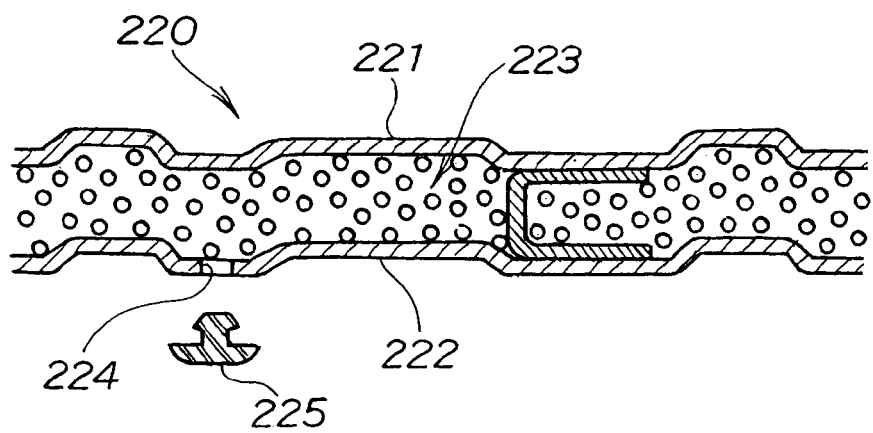
FIG. 15 is a sectional view showing a third skeleton structure member of related art.
Figure 16:
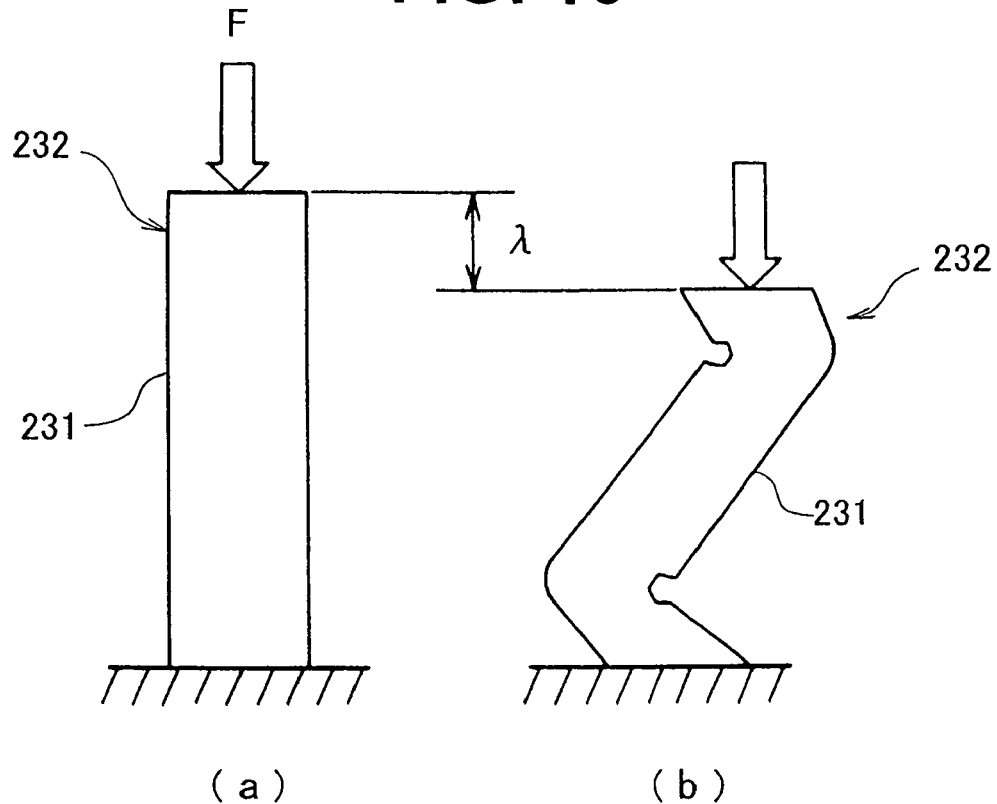
FIG. 16 is a view showing deformation of a skeleton structure member of related art.
Figure 17:
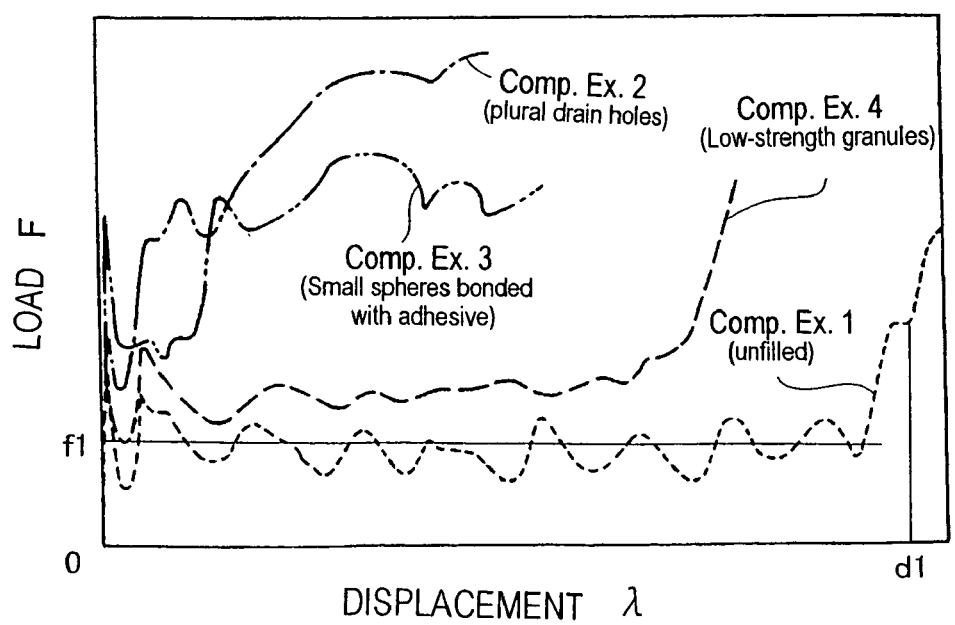
FIG. 17 is a graph showing a relationship between load and displacement of when the skeleton structure member shown in FIG. 16 deforms.
Figure 18:
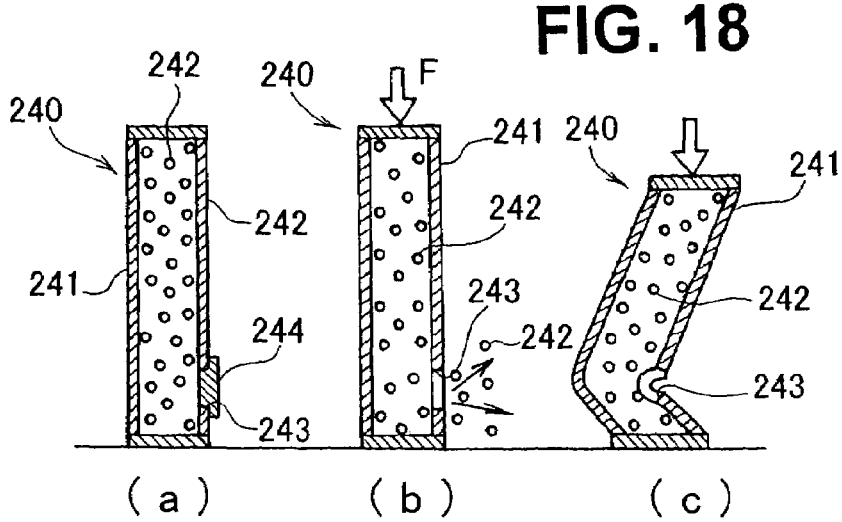
FIG. 18 is a view showing deformation taking place when one drain hole for granules to flow through is formed in a skeleton structure member.
Figure 19:
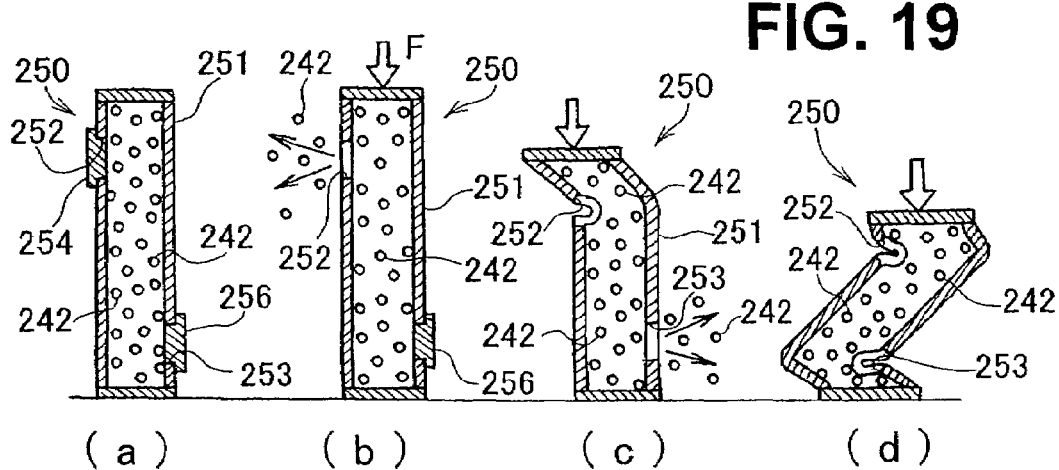
FIG. 19 is a view showing deformation taking place when a plurality of drain holes for granules to flow through are formed in a skeleton structure member.
Figure 20:
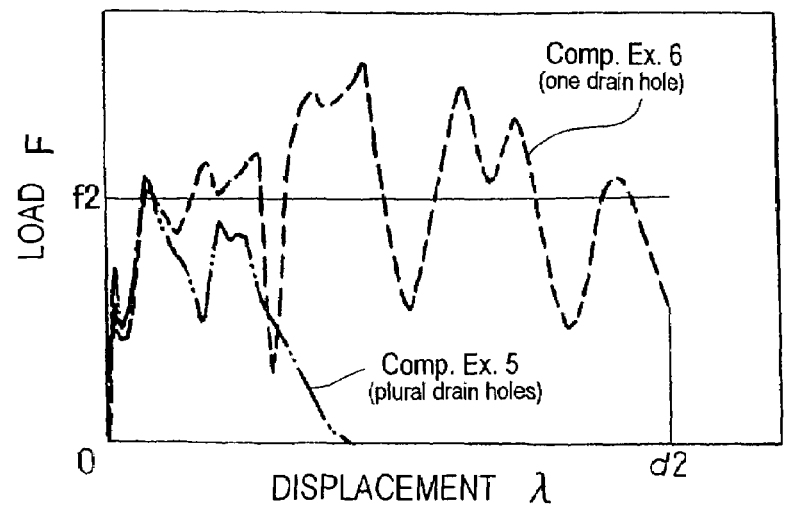
FIG. 20 is a graph showing a relationship between load and displacement of when the skeleton structure members shown in FIG. 18 and FIG. 19 are crushed.

FIG. 12A and FIG. 12B show skeleton structure members according to a seventh embodiment.

The skeleton structure member 110 of the seventh embodiment shown in FIG. 12A is made up of a skeleton member 11 and a granule-filled member 112 provided inside this skeleton member 11. The granule-filled member 112 has a closed space 113 bounded by a cross-sectionally rectangular wall part 112a, and the closed space 113 is filled with multiple granules 17.

Between the skeleton member 11 and the granule-filled member 112 is formed a granule flow allowing part 114 consisting of a space.

When an axial compressive load acts on the skeleton structure member 110, because the multiple granules 17 are packed tightly in the closed space 113 of the granule-filled member 112, the internal pressure of the granule-filled member 112 rises. Then, the granules 17 push on the wall part 112a of the granule-filled member 112 and deform and break the wall part 112a outward, i.e. toward the granule flow allowing part 114 consisting of a space, and the granules 17 flow into the granule flow allowing part 114. As a result, the internal pressure of the skeleton structure member 110 as a whole is kept constant, and its absorbed energy increases.

The skeleton structure member 120 shown in FIG. 12B is a variation of the skeleton structure member 110 of the seventh embodiment shown in FIG. 12A.

This variant skeleton structure member 120 is made up of a skeleton member 11 and a granule-filled member 122 provided inside this skeleton member 11. This granule-filled member 122 has a closed space 123 bounded by a cross-sectionally cross-shaped wall part 122a with four corner parts cut away, and the inside of the closed space 123 is filled with multiple granules 17.

Between the skeleton member 11 and the granule-filled member 122, in other words in the four corner parts where the granule-filled member 122 is cut away, granule flow allowing parts 124 consisting of spaces are formed.

The effect of this skeleton structure member 120 is the same as the effect of the skeleton structure member 110 shown in FIG. 12A.

Although in this embodiment, (1) an example was shown wherein a space bounded by a skeleton member and a granule flow allowing part, or a space inside a granule-filled member, is filled with granules, the invention is not limited to this, and alternatively (2) a space bounded by a skeleton member and a panel member around that may be filled with granules, or spaces (1) and (2) may both be filled with granules.

INDUSTRIAL APPLICABILITY

Because the skeleton structure member of this invention increases the energy absorbed by a skeleton structure member, it is suited to skeleton structure members used in transport machines such as railroad cars, industrial vehicles, ships, aircraft, automobiles and motorcycles.

The invention claimed is:

1. A skeleton structure member for use in a transport machine, the skeleton structure member comprising:
   a skeleton member;
   multiple granules packed in a space that is inside the skeleton member and/or bounded by the skeleton member and a panel member around the skeleton member; and
   a granule flow allowing part provided close to the multiple granules packed in the space and extending along an axial direction of the skeleton structure member, the granule flow allowing part being adapted to allow flow of the multiple granules in a direction perpendicular to the axial direction so as to suppress an excessive pressure increase in the space when an axial compressive load is applied to the skeleton structure member.

2. The skeleton structure member according to claim 1, wherein the granule flow allowing part is provided inside the skeleton member and comprises a cavity forming member that defines a cavity.

3. The skeleton structure member according to claim 2, wherein the cavity forming member is bellows-shaped.

4. The skeleton structure member according to claim 2, wherein the cavity forming member has a wall part having a first end at which a load acts on the skeleton structure and a second end opposite to the first end, and wherein the cavity forming member wall part widens from the first end to the second end.

5. The skeleton structure member according to claim 1, wherein the granule flow allowing part comprises a foam member that is provided inside the skeleton member.

6. The skeleton structure member according to claim 1, wherein the granule flow allowing part comprises granules provided inside the skeleton member and wherein said granules provided inside the skeleton member are weaker in strength than said multiple granules.

7. The skeleton structure member according to claim 1, wherein the granule flow allowing part comprises multiple granule flow allowing parts of different lengths, said multiple granule flow allowing parts being provided inside the skeleton member.

* * * * *